(12) United States Patent
Kim et al.

(10) Patent No.: US 9,121,446 B2
(45) Date of Patent: Sep. 1, 2015

(54) STRUCTURE FOR MOUNTING BEARING BRACKET

(71) Applicant: Hyundai Motor Company, Seoul (KR)

(72) Inventors: Jang-Ho Kim, Hwaseong Gyeonggi-Do (KR); Sung-Su Yoo, Hwaseong Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 55 days.

(21) Appl. No.: 14/142,875

(22) Filed: Dec. 29, 2013

(65) Prior Publication Data

US 2015/0086145 A1  Mar. 26, 2015

(30) Foreign Application Priority Data

Sep. 26, 2013  (KR) .......................... 10-2013-0114307

(51) Int. Cl.
*F16C 35/00* (2006.01)
*F16C 43/00* (2006.01)
*F16C 35/04* (2006.01)
*F16C 35/02* (2006.01)

(52) U.S. Cl.
CPC ............... *F16C 35/042* (2013.01); *F16C 35/02* (2013.01)

(58) Field of Classification Search
CPC ........ F16C 35/06; F16C 35/063; F16C 35/07; F16C 35/077

USPC .......................... 384/441, 542, 584, 428, 537
See application file for complete search history.

(56) References Cited

U.S. PATENT DOCUMENTS

| 5,417,501 | A  | * | 5/1995 | Hyde et al. ..................... 384/542 |
| 7,303,495 | B2 | * | 12/2007 | Schoenek et al. ............. 474/144 |
| 2010/0059642 | A1 | | 3/2010 | McLeod |
| 2011/0214944 | A1 | | 9/2011 | Levi |

FOREIGN PATENT DOCUMENTS

| CN | 203157599 U | * | 8/2013 |
| JP | 58149824 A  | * | 9/1983 |
| KR | 10-2009-0106140 | | 10/2009 |
| KR | 10-2012-0020748 | | 3/2012 |

\* cited by examiner

*Primary Examiner* — Phillip A Johnson
(74) *Attorney, Agent, or Firm* — Mintz Levin Cohn Ferris Glovsky and Popeo, P.C.; Peter F. Corless

(57) ABSTRACT

A structure for mounting a bearing bracket is provided. The structure includes a supporting portion into which a drive shaft is fitted and a coupling portion which is enlarged from the supporting portion and is fastened by bolts to a fixing portion formed at a power train. The coupling portion has two or more apertures into which the bolts are inserted, and at least one enlarged portion that protrudes on a surface, which comes into contact with the fixing portion, to enlarge a length of each apertures, and the fixing portion has bolt bore opened to correspond to the apertures of the coupling portion, respectively, and an enlarged groove formed at the bolt bore where the enlarged portion enters and has an increased diameter to fit the enlarged portion into the enlarged groove.

5 Claims, 6 Drawing Sheets

STRUCTURE FOR MOUNTING BEARING BRACKET

CROSS-REFERENCE TO RELATED APPLICATIONS

This application claims priority under 35 U.S.C. §119 to Korean Patent Application No. 10-2013-0114307, filed on Sep. 26, 2013, in the Korean Intellectual Property Office, the disclosure of which is incorporated herein by reference in its entirety.

BACKGROUND

1. Field of the Invention

The present invention relates to a structure for mounting a bearing bracket which is provided to mount a drive shaft connected to a power train and transmits rotational force to a wheel, and more particularly, to a structure for mounting a bearing bracket which has an enlarged portion integrally formed to guide the bearing bracket to a position without additionally mounting a dowel pin, a neck bushing, or the like.

2. Description of the Related Art

In the case of an FF type (Front Engine Front drive system) vehicle, a drive shaft is mounted to connect each of both ends of the drive shaft to a final drive of a transmission and a wheel hub to transmit rotational force of an engine to a wheel. The drive shaft is connected to the final drive and the wheel hub using a constant velocity joint. Further, two drive shafts are mounted to be connected to both wheels with the transmission being positioned at the substantially center between the two drive shafts. The drive shafts may be classified into a non-constant length type in which both the drive shafts have different lengths (since the transmission is positioned to deviate from a center of a vehicle), and a constant length type in which both the drive shafts have the same length.

A bearing bracket is mounted to the constant-length-type drive shaft, and the bearing bracket is mounted to be fixed to a lower portion of the transmission. In particular, as illustrated in FIG. 1, the bearing bracket in the related art includes: a supporting portion 2 that has a ring shape to fit a drive shaft 1 into the supporting portion 2, and has a bearing embedded in the supporting portion 2; and a coupling portion 2a that has a substantially flat surface with a shape enlarged from the supporting portion 2 to one side, and is coupled to a fixing portion 3a formed at a power train 3 (e.g., on the transmission). The bearing bracket is mounted by fitting bolts 6 into the coupling portion 2a, and thereafter, coupling the bolts 6 to bolt bores 4 formed in the fixing portion 3a.

Moreover, the bearing bracket should be mounted to a particular position in a particular direction at the time of mounting the bearing bracket. Accordingly, to guide the bolt 6 to be fastened to the particular position, dowel pins 7 are fitted into the coupling portion 2a, and dowel pin bores 5 into which the dowel pins 7 are inserted are additionally formed in the fixing portion 3a.

Even though the dowel pin 7 may be selectively used to mount the bearing bracket, when a mounting position of the bearing bracket is not properly aligned, an adverse effect on durability as well as noise and vibration may occur due to characteristics of the drive shaft rotated at a substantially high speed, and thus the dowel pins or components such as a neck bushing and the like that have similar functions to the dowel pins are additionally mounted to mount the bearing bracket. However, the aforementioned addition of the dowel pins may cause an increase in area of the coupling portion and an increase in volume of the bearing bracket and the fixing portion. In addition, the dowel pins may require an operation of processing bores into which the dowel pins are fitted, and an additional process of assembling the dowel pins.

SUMMARY

The present invention provides a structure for mounting a bearing bracket that guides proper alignment of a bearing bracket without additionally mounting a dowel pin.

An exemplary embodiment of the present invention provides a structure for mounting a bearing bracket that may: a supporting portion into which a drive shaft may be fitted; and a coupling portion which may be enlarged from the supporting portion and may be fastened by bolts to a fixing portion formed at a power train, in which the coupling portion may have two or more apertures into which the bolts may be inserted, and at least one enlarged portion that may protrude on a surface, which comes into contact with the fixing portion, to enlarge a length of the aperture, and the fixing portion may include bolt bores opened to correspond to the apertures of the coupling portion, respectively, and an enlarged groove formed at the bolt bore where the enlarged portion may be inserted and may have an increased diameter to fit the enlarged portion into the enlarged groove.

The enlarged portion may include an arrangement guide portion having an outer circumferential surface that may be an inclined surface causing a thickness of the enlarged portion to decrease toward an end of the enlarged portion. Further, the enlarged portion may further include an alignment portion which may have an outer circumferential surface that forms a right angle with the surface of the coupling portion at a position spaced apart from the arrangement guide portion. The alignment portion may be formed at a lower end of the enlarged portion, and the arrangement guide portion may be formed at an upper end of the enlarged portion, to fit the enlarged portion positioned at an upper side of the supporting portion into the enlarged groove when the bearing bracket is rotated around a rotation axis of the drive shaft when the drive shaft is coupled to the supporting portion. In addition, the apertures may be formed in three positions to form a triangular shape of the positions of the apertures, and the enlarged portion may be formed at the apertures spaced farthest apart from the supporting portion.

In the present invention, a process of mounting the dowel pin may be omitted, thus reducing sizes of the bearing bracket and the fixing portion formed at the power train, production costs, and the number of assembly processes may be reduced. The related art has a structure in which in a process of assembling a bearing bracket, the bearing bracket is horizontally moved to a predetermined degree in a longitudinal direction of a dowel pin to be coupled to a fixing portion, but in contrast, the present invention has a structure in which the arrangement guide portion may be formed to have an inclined surface to rotate the bearing bracket around a rotation axis of the drive shaft to be coupled to the fixing portion. Accordingly, the bearing bracket may be mounted more easily, to further improving work efficiency.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
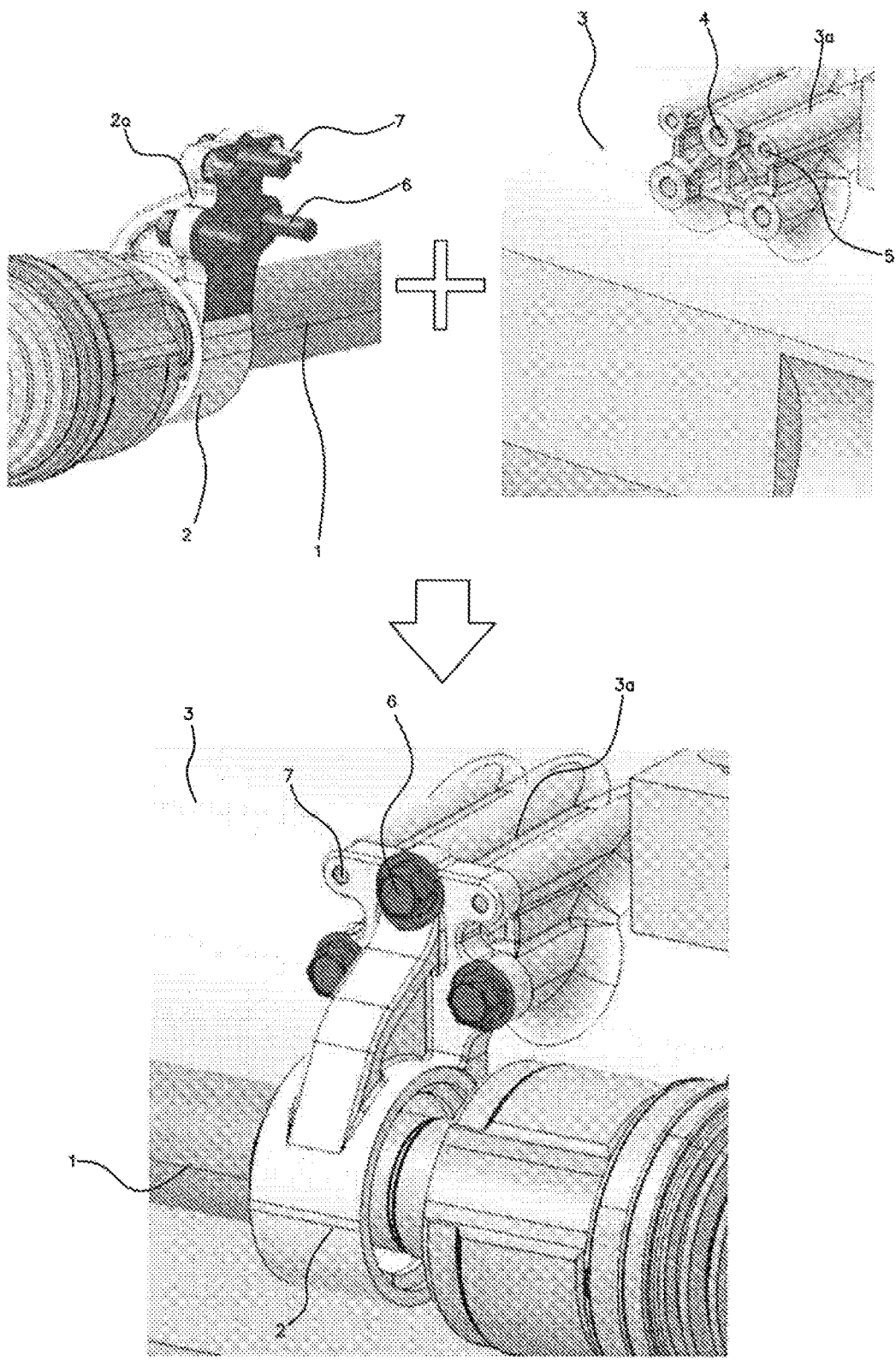
FIG. 1 is an exemplary view illustrating a bearing bracket mounted using dowel pins according to the related art.
Figure 2:
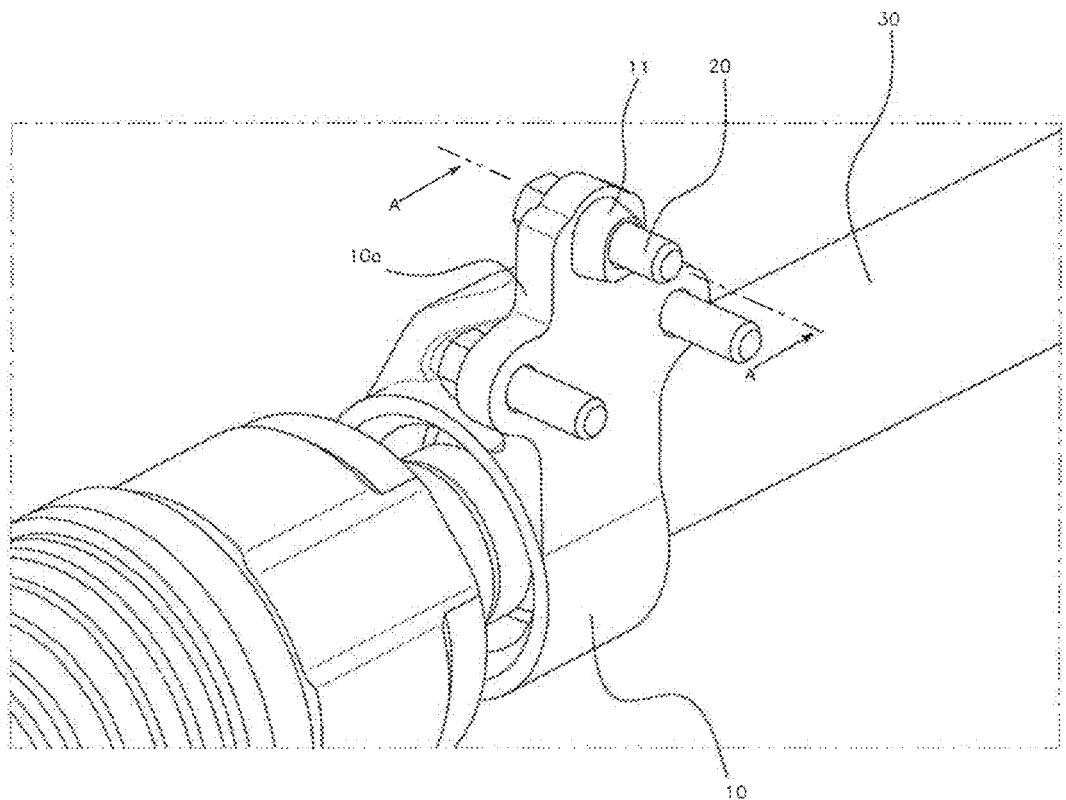
FIG. 2 is an exemplary view illustrating a bearing bracket coupled to a drive shift according to an exemplary embodiment of the present invention.

Hereinafter, a structure for mounting a bearing bracket according to an exemplary embodiment of the present invention will be described in more detail with reference to the drawings. Referring to the accompanying FIGS. 2 to 4, a bearing bracket according to the present invention may include a supporting portion 10 having a ring shape, and a bearing (not illustrated) embedded in the supporting portion 10 to fix a drive shaft 30 into the bearing, and a coupling portion 10a enlarged from the supporting portion 10, and the bearing bracket in which the coupling portion 10a may be fastened by bolts 20 to a fixing portion 40a formed at a power train 40.

The coupling portion 10a may have a flat surface that comes into contact with the fixing portion 40a, and apertures into which the bolts 20 may be inserted may be formed in three positions of the coupling portion 10a. The apertures may be disposed to form the positions of the apertures as a triangular shape, and at the apertures spaced farthest apart from the supporting portion 10, that is, the apertures positioned at an uppermost end, an enlarged portion 11 may protrude on the surface, which comes into contact with the fixing portion 40a, to enlarge a length of the aperture.

Figure 3:
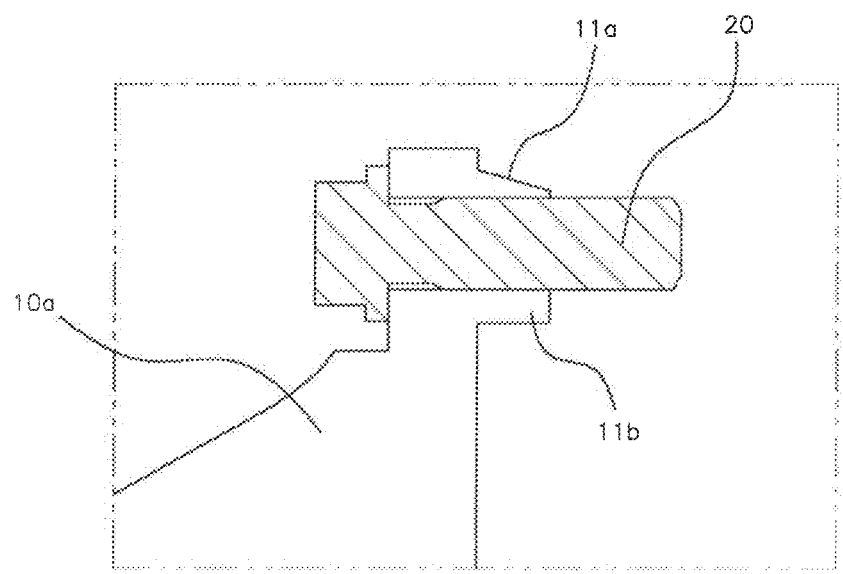
FIG. 3 is an cross-sectional view taken along line A-A of FIG. 2 according to an exemplary embodiment of the present invention.
Figure 4:
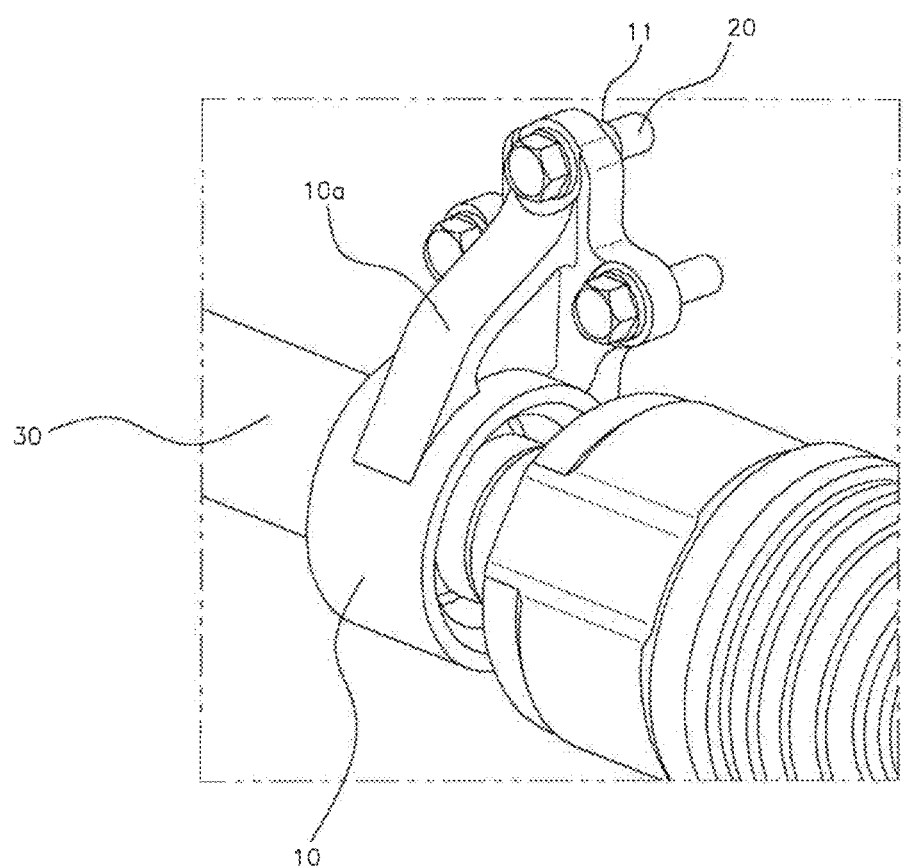
FIG. 4 is an exemplary view illustrating the bearing bracket in a direction different from that of FIG. 2, according to the exemplary embodiment of the present invention.

As more clearly illustrated in FIG. 3, the enlarged portion 11 (11a and 11b) may include an arrangement guide portion 11a having an outer circumferential surface as an inclined surface causing a thickness of the enlarged portion 11 to decrease toward an end of the enlarged portion 11, and an alignment portion 11b having an outer circumferential surface to form a right angle with the surface of the coupling portion 10a. The arrangement guide portion 11a may be formed at an upper end of the enlarged portion, and the alignment portion 11b may be formed at a lower end of the enlarged portion.

Figure 5:
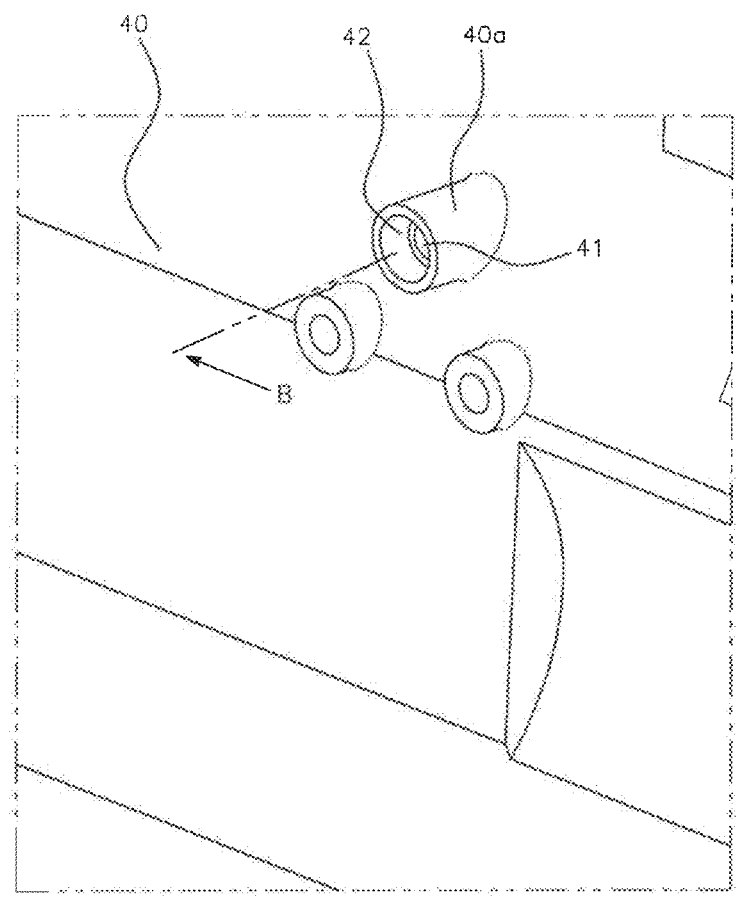
FIG. 5 is an exemplary view illustrating a fixing portion is formed at a power train according to an exemplary embodiment of the present invention.
Figure 6:
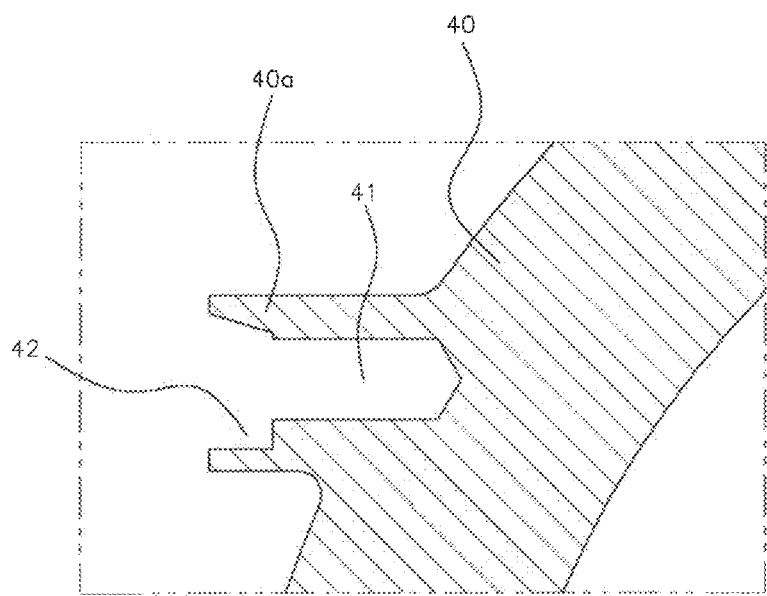
FIG. 6 is an exemplary cross-sectional view taken along line B of FIG. 5 according to an exemplary embodiment of the present invention.

The fixing portion 40a, may be formed at the power train 40 (formed on an outer surface of the transmission that constitutes the power train by being coupled to an engine), and may include at least three bolt bores 41 opened to correspond to the apertures of the coupling portion 10a, respectively. Further, as illustrated in FIGS. 5 and 6, an enlarged groove 42 may be formed at the bolt bore 41, where the enlarged portion may be inserted, among the three bolt bores 41, and the enlarged groove 42 may have an increased diameter to fit the enlarged portion into the enlarged groove 42. The bearing bracket of the present invention, may be mounted when the bearing bracket is rotated around a rotation axis of the drive shaft 30 when the drive shaft 30 is coupled to the supporting portion 10.

Figure 7A:
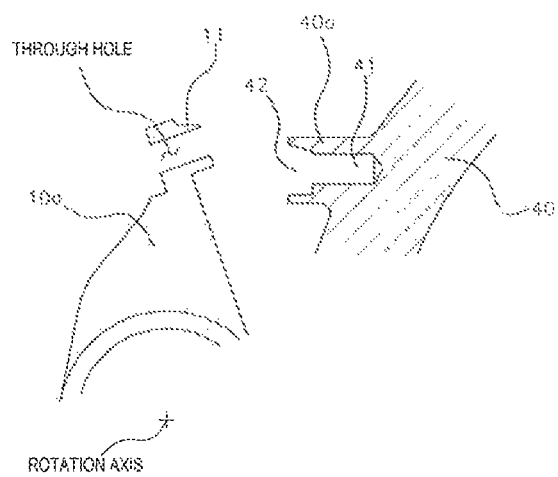
FIGS. 7A-7D is an exemplary view illustrating the mounted bearing bracket according to the exemplary embodiment of the present invention.
Figure 7B:
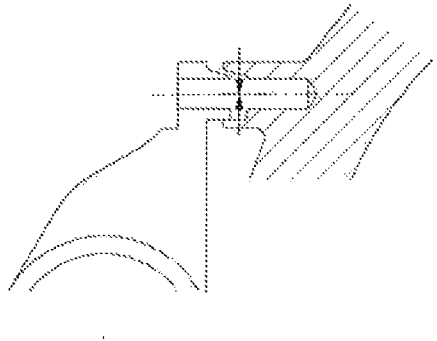
Figure 7C:
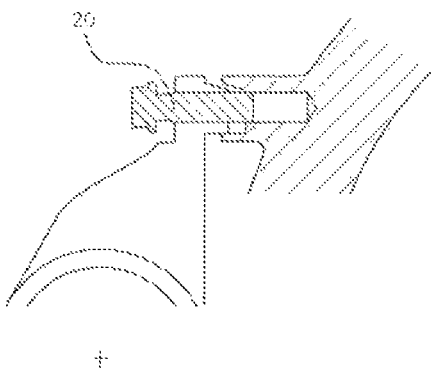
Figure 7D:
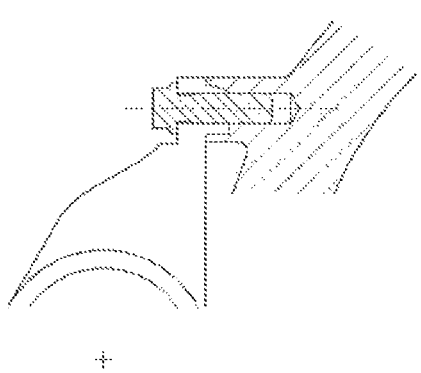

Referring to FIGS. 7A-7D, the bearing bracket, which is configured as described above, may be disposed at a position where the enlarged portion may be fitted into the enlarged groove 42 when the drive shaft 30 is fitted into the supporting portion 10 (FIG. 7A). When the bearing bracket is rotated around the rotation axis of the drive shaft 30, the alignment portion 11b of the enlarged portion may lie on a lower end of the enlarged groove 42 (FIG. 7B). The bolts 20 may be fitted into the apertures (FIG. 7C), and thereafter, when the bolts 20 are completely fastened, the bearing bracket may be completely mounted (FIG. 7D).

In particular, as the enlarged portion enters the enlarged groove 42 while fastening the bolts 20, the arrangement guide portion 11a may slide in the enlarged groove 42 that guides the bolts 20 to be fastened to a particular position. In other words, torque applied to the bolts 20 may be converted into three that guides alignment to perform self-alignment. In addition, in the above arrangement guide portion 11a, formed at the upper end of the enlarged portion, may be formed as an inclined surface, and the alignment portion 11b may be formed as a surface that forms a substantially right angle to implement a catching function to temporarily fasten the bearing bracket while assembling the bearing bracket (e.g., during steps of FIGS. 7B-7C).

The purpose of the present invention may be to secure NVH (noise, vibration, and harshness) performance and durability of the bearing bracket when the bearing bracket is fastened to the power train 40. The structure of the present invention may fix a position and a direction of the bearing bracket before and while fastening the bolts, and substitutes for components (e.g., dowel pins and components that have similar functions to the dowel pins) in the related art. In other words, in the structure in the related art, the dowel pins and the components, which have similar functions to the dowel pins, fix a position and a direction of the bearing bracket before fastening the bolts. In addition, since a shape of the structure in the related art is a substantially straight line shape, the bearing bracket horizontally approached toward the fixing portion when temporarily fastening the bearing bracket an interference factor while assembling the bearing bracket may occur.

In the structure of the present invention, the enlarged portion (e.g., having an inclined surface) may be substituted for the dowel pins of the related art and may not act as an interference factor before, after, and while fastening the bolts. In addition, the structure of the present invention may be to perform a simple function of fixing a position and a direction of the bearing bracket and a self-alignment function to perform a process of mounting the bearing bracket more easily.

For reference, even though it has been described in the aforementioned exemplary embodiment that the enlarged portion may be formed at the bearing bracket, the present invention may have a structure in which the enlarged portion may be formed at the power train side, and the enlarged groove may be formed in the bearing bracket. In addition, even though it has been described that the enlarged portion may be formed at a single aperture, which may be positioned at the uppermost end, among the plurality of apertures, the enlarged portion may be formed at all of apertures or two apertures to obtain a more efficient self-alignment effect.

As the foregoing, the exemplary embodiments of the present invention disclosed in the present specification and the drawings merely suggests specific examples for better understanding of the present invention, but are not intended to limit the scope of the present invention. It is obvious to those having ordinary skill in the technical field to which the present invention pertains that in addition to the exemplary embodiments disclosed herein, various modifications may be implemented based on the technical spirit of the present invention.

What is claimed is:

1. A structure for mounting a bearing bracket comprising:
a supporting portion into which a drive shaft is fitted; and
a coupling portion enlarged from the supporting portion and fastened by a bolt to a fixing portion formed at a power train,
wherein the coupling portion has an aperture into which the bolt is inserted, and an enlarged portion that protrudes on a surface, which comes into contact with the fixing portion, to enlarge a length of the aperture, and
wherein the fixing portion has a bolt bore opened to correspond to the aperture of the coupling portion, and an enlarged groove formed at the bolt bore where the enlarged portion is inserted and has an increased diameter to fit the enlarged portion into the enlarged groove.

2. The structure of claim 1, wherein the enlarged portion includes an arrangement guide portion which has an outer circumferential surface as an inclined surface to decrease a thickness of the enlarged portion toward an end of the enlarged portion.

3. The structure of claim 2, wherein the enlarged portion further includes an alignment portion which has an outer circumferential surface to form a right angle with the surface of the coupling portion at a position spaced apart from the arrangement guide portion.

4. The structure of claim 3, wherein the alignment portion is formed at a lower end of the enlarged portion, and the arrangement guide portion is formed at an upper end of the enlarged portion, to fit the enlarged portion positioned at an upper side of the supporting portion into the enlarged groove when the bearing bracket is rotated around a rotation axis of the drive shaft when the drive shaft is coupled to the supporting portion.

5. The structure of claim 4, wherein two or more apertures are formed, and the enlarged portion is formed at the aperture spaced farthest apart from the supporting portion.

* * * * *